Dec. 5, 1967 L. A. BEAUDRY 3,355,965
BRAKE LOCK
Filed Oct. 28, 1965
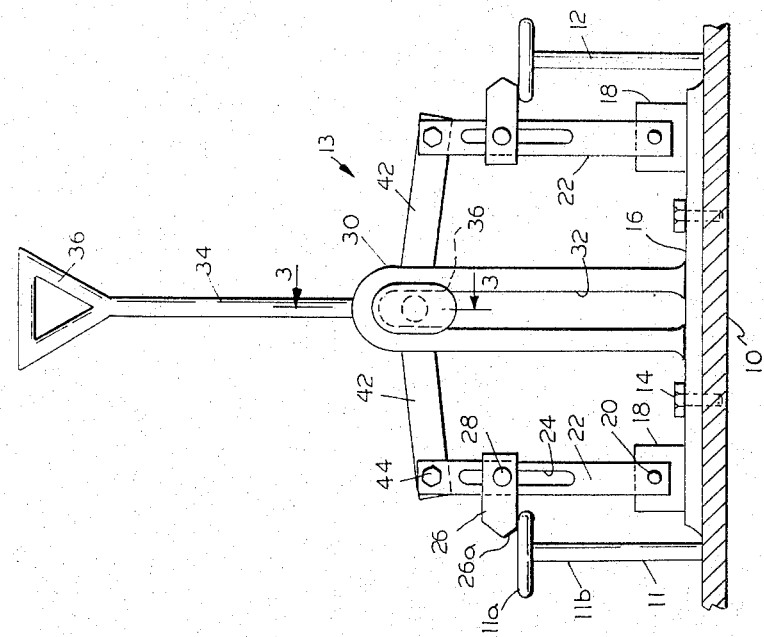
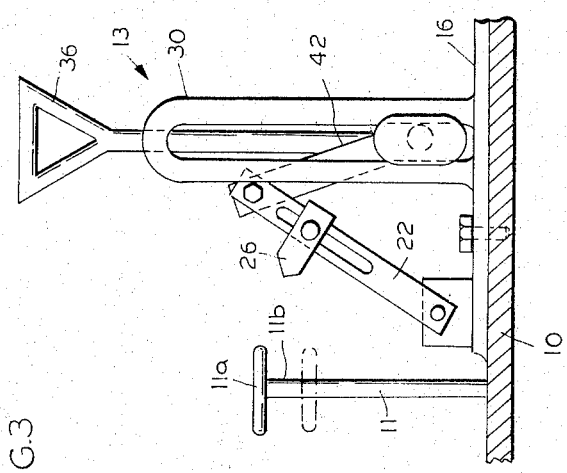
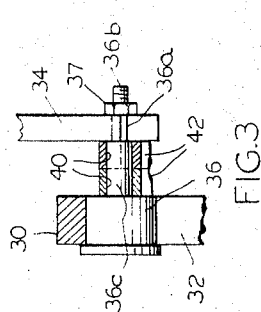
INVENTOR
LAWRENCE A. BEAUDRY
BY Kolisch + Hartwell
ATTORNEYS 3,355,965
BRAKE LOCK
Lawrence A. Beaudry, Box 546,
White Salmon, Wash. 98672
Filed Oct. 28, 1965, Ser. No. 505,526
6 Claims. (Cl. 74—532)

This invention relates to vehicles, and more particularly to improvements for a vehicle with a braking system including a brake pedal in the form of a lock adapted to lock the pedal of the braking system in a position braking wheel movement. The lock may be incorporated with a coventional foot brake pedal to provide an effective vehicle safety brake.

Heavy operating equipment and other vehicles having pedal-operated braking systems have been provided in the past with safety brake devices that lock the braking system by holding one or more brake pedals in brake-actuating position. A disadvantage of many of such brake locks is that their construction requires them constantly to be attached to a brake pedal, even when not in use, precluding unhindered movement of the pedal during normal operating periods of the vehicle. Others, while not attached always to a brake pedal, make only loose contact with a pedal when placed in operation, presenting constantly the threat of accidental release. Most devices are so complicated that they unduly clutter the space around the pedals, or require extensive vehicle modification for installation.

Generally, an object of this invention is to provide an improved vehicle brake lock, operable when actuated positively to hold a brake pedal in a brake-actuating position.

Another object of this invention is to provide a novel brake lock for holding one or more brake pedals of a vehicle depressed or in a position where the vehicle brakes are engaged, which moves free of the vehicle's pedal or pedals when not in use to accommodate unhindered movement in the pedals.

A still further object is to provide, in a brake lock, novel linkage including a pivoted link with one end that moves past an over-centered position with respect to the link's opposite end when the lock is in operative, brake-actuating position.

A related object is to provide a brake lock which is easily installed without major modification of a vehicle, and which when installed provides minimum interference with normal vehicle operation.

These and other objects and advantages are attained by the invention, and reference is made to the accompanying drawings which illustrate an embodiment thereof, wherein:

FIG. 1 is a front elevation of a brake lock, as constructed for a vehicle with two brake pedals, showing the lock in a position holding the pedals depressed;

FIG. 2 is a view similar to portions of FIG. 1, but showing the lock released from the brake pedals; and FIG. 3 is a view taken along line 3—3 in FIG. 1.

Referring now to the drawings, at 10 is indicated generally a vehicle floor or floorboard. Projecting upwardly through floor 10 are two laterally spaced foot brake pedals 11, 12, each of which includes a foot rest such as rest 11a and a supporting post such as post 11b. The pedals are part of a conventional vehicle braking system including brakes for vehicle wheels (not shown). Actuation of the braking system is accomplished by forcibly depressing the foot pedals toward the floor, to positions such as the one indicated in dashed outline for pedal 11 in FIG. 2. When the pedals are released, conventional biasing means (not shown) return the pedals to their original elevated position with the vehicle brakes then being disengaged.

A mechanical brake lock as contemplated herein is shown generally at 13. The brake lock is shown mounted on the vehicle floor between pedals 11 and 12.

Brake lock 13 comprises a mounting in the form of a base plate 16 attached by bolts 14 to the vehicle floor. Plate 16 is formed to match the top surface contour of the vehicle floor. Attached to the top of base plate 16 is a pair of laterally spaced standards 18.

Journaled to each standard at 20 is an elongated arm 22. Journal 20 enables an arm to swing about an axis which is substantially perpendicular to the posts of the brake pedals. Each arm in one of its positions is inclined away from the brake pedal adjacent, as shown in FIG. 2, and with a brake pedal locked in a depressed position occupies an upright position as shown in FIG. 1. An elongated opening 24 extends along a portion of the upper part of each arm.

Mounted on each arm and extending laterally outwardly thereof is a pedal-engaging catch or retaining means 26. With an arm upright, catch 26 may be passed over the top of a brake pedal (providing the pedal has first been depressed) to hold the pedal in its depressed position. Catch 26 is bounded adjacent its base by a beveled lower edge 26a, which is provided to facilitate fitting the catch over the top of a brake pedal. The catch is fastened to an arm by a nut and bolt assembly 28 which passes through an accommodating bore in the catch and opening 24 in the arm. On loosening of the nut and bolt assembly the catch is free to slide longitudinally along an arm within the limits defined by opening 24. The connection described permits a catch to be adjusted to different fixed positions on its supporting arm whereby any change in the pedal travel required to produce brake actuation may be taken care of.

An upright guide member 30 is attached to the top of base plate 16 at a point midway between standards 18. In the embodiment of the invention shown guide member 30 comprises an inverted U-shaped bar, which is welded to base plate 16. The bar defines an elongated guide slot or passage 32 in the guide member which is closed at both upper and lower ends.

Positioned adjacent and substantially parallel to guide member 30 is an upright operating rod 34 with a handle 35 attached to its upper end. The lower end of the operating rod has a shoe 36 of greater height than width attached thereto. The shoe is connected to the rod through a square shaft portion 36a joined to the shoe which fits through a hole of matching outline at the base of the rod, and a screw threaded portion 36b joined to the shoe havign a nut 37 screwed thereon. The shoe is slidable up and down in opening 32, but because of the shape of the shoe, the shoe is kept from rotating within the opening. Operating rod 34 thus is capable of vertical travel in a path paralleling opening 32, and the extent of such travel is limited by the length of opening 32. The square shaft which mounts the rod on the shoe maintains the rod upright in all of its positions.

Extending between the lower end of operating rod 34 and arms 22 on either side thereof are a pair of rigid links 42. Each link is pivotally connected to the base of rod 34, through a bore 40 provided in an end of the link which is journaled on journal portion 36c of the shoe. Each link has its opposite end pivotally connected at 44 to the upper end of one of the arms 22. The connection described enables the operating rod, when moved upwardly, to swing the arms 22 from the inclined position such as the one shown for an arm in FIG. 1, to the upright position shown for the arms in FIG. 2.

It will be noted that the end of a link which is attached to the base of bar 34 in FIG. 2 is considerably lower than the opposite end of the link which is attached to an arm 22. On raising of the operating rod with swinging of the arms 22, the links pass through positions which are substantially perpendicular to the arms to which the links are attached, and finally assume positions wherein the ends connected to the operating rod are slightly higher than the ends pivoted to arms 22. In other words, each link has an end which swings past an over-centered position relative to its opposite end. Because of this feature, with the rod fully raised and shoe 36 at the upper extremity of opening 32, each arm 22 is prevented from swinging away from its associated brake pedal inadvertently to release the pedal.

To operate the brake lock the brake pedals are first depressed to actuate the vehicle braking system. The operating rod is raised, which raising through links 42 produces pivoting of arms 22 to the upright positions shown in FIG. 2. With the arms swung upright, the catches on the arms pass over the foot rests of the pedals thus to engage the pedals and hold the pedals depressed.

While an embodiment of the invention has been described, variations are possible without departing therefrom. It is desired to cover all such modifications and variations as would be apparent to one skilled in the art, and that come within the scope of the appended claims.

It is claimed and desired to secure by Letters Patent:

1. In combination with a vehicle having a braking system including at least one brake pedal for actuating the system,
    a mechanical brake lock mounted on said vehicle adjacent said brake pedal, but out of contact therewith,
    said brake lock including a pivotally mounted link with ends that are shiftable past an over-centered position relative to each other, and
    means engageable with said brake pedal when said link has its ends so shifted operable to hold said pedal in a position actuating the braking system.

2. The combination of claim 1, wherein the means engageable with said brake pedal comprises a catch, and means pivotally interconnecting said catch and said link.

3. For a vehicle having a floor and a braking system including at least one depressible brake pedal mounted adjacent said floor for actuating said braking system on depressing of said pedal, a brake lock comprising
    a mounting adapted to be mounted on the floor of said vehicle adjacent the brake pedal,
    an elongated arm pivoted adjacent one end to said mounting,
    a catch projecting laterally from said arm,
    an element mounted in said guide member for movement in an upright part defined by said guide member, and
    pin-connected linkage means interconnecting the lower end of said element and the upper end of said arm.

4. The brake lock of claim 3, wherein the catch projecting from said arm is mounted on said arm for movement between different fixed positions therealong.

5. The lock of claim 4, wherein the guide member comprises an elongated bar having a passage extending therealong, said element is mounted for movement within said passage, and which further comprises a pull rod connected to said element which projects upwardly therefrom.

6. Mechanism for holding a brake pedal depressed and adjacent the floorboard of a vehicle comprising
    an inclined arm disposed in the vehicle in a region located beneath the top of the brake pedal, and a pivot mounting for one end of the arm accommodating movement of the arm from its inclined position to an upright position,
    a brake pedal catch joined to said arm, said catch being movable to a position engaging a brake pedal upon the arm being swung from its inclined position to an upright position,
    a link inclined relative to said arm pivotally connected at one end to the end of said arm opposite the arm's said one end,
    a guiding element mounted on the opposite end of said link,
    an elongated guide member positioned to one side of the brake pedal having the guiding element mounted thereon and including means defining a path of travel for said element extending along the guide member, and
    means for shifting the guiding element along said path of travel with said link upon such shifting moving from its position inclined to the arm past a position normal to the arm, such movement of the link being coupled with movement of said arm from its said inclined position to its said upright position.

References Cited
UNITED STATES PATENTS

| | | | |
|---|---|---|---|
| 478,398 | 7/1892 | Campbell | 74—532 |
| 1,711,929 | 5/1929 | Druhe | 188—265 |
| 2,666,291 | 1/1954 | Skorecki | 74—521 |
| 2,669,882 | 2/1954 | Shaffer et al. | 74—532 |
| 2,812,669 | 11/1957 | Reff | 74—532 |

FRED C. MATTERN, Jr., *Primary Examiner.*

W. S. RATLIFF, *Assistant Examiner.*